Feb. 1, 1927.
J. B. STRAUSS
1,615,891
BASCULE BRIDGE
Filed Feb. 28, 1925      3 Sheets-Sheet 1
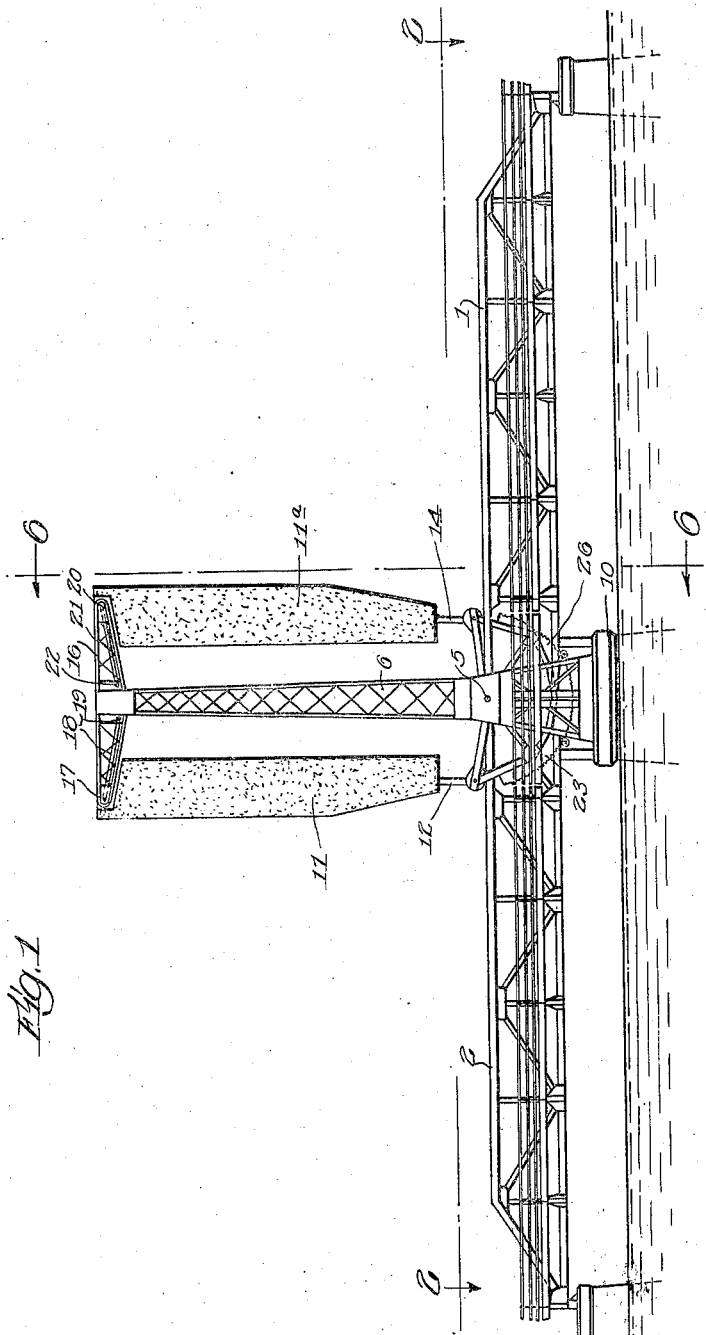
Inventor:
Joseph B. Strauss
By Parker & Carter Attys.

Feb. 1, 1927.
J. B. STRAUSS
1,615,891
BASCULE BRIDGE
Filed Feb. 28, 1925    3 Sheets-Sheet 2
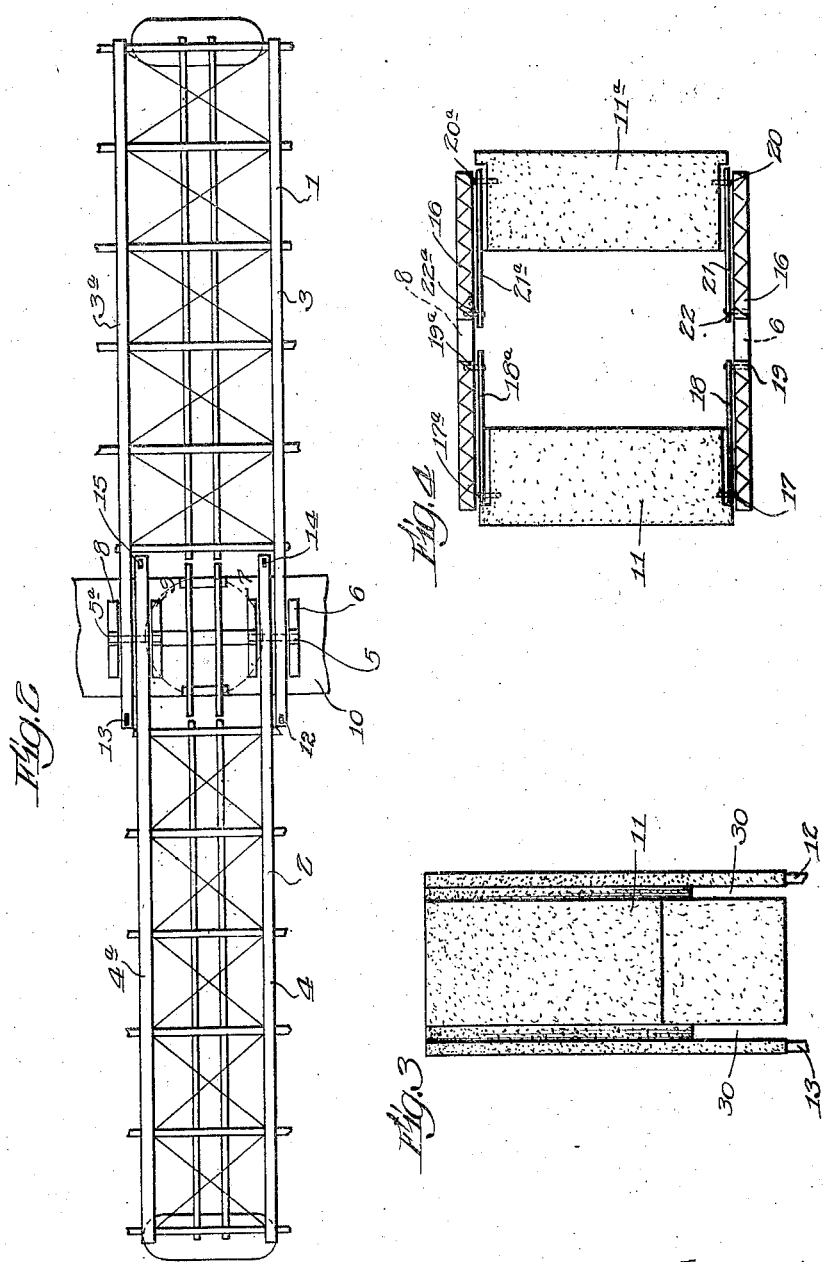

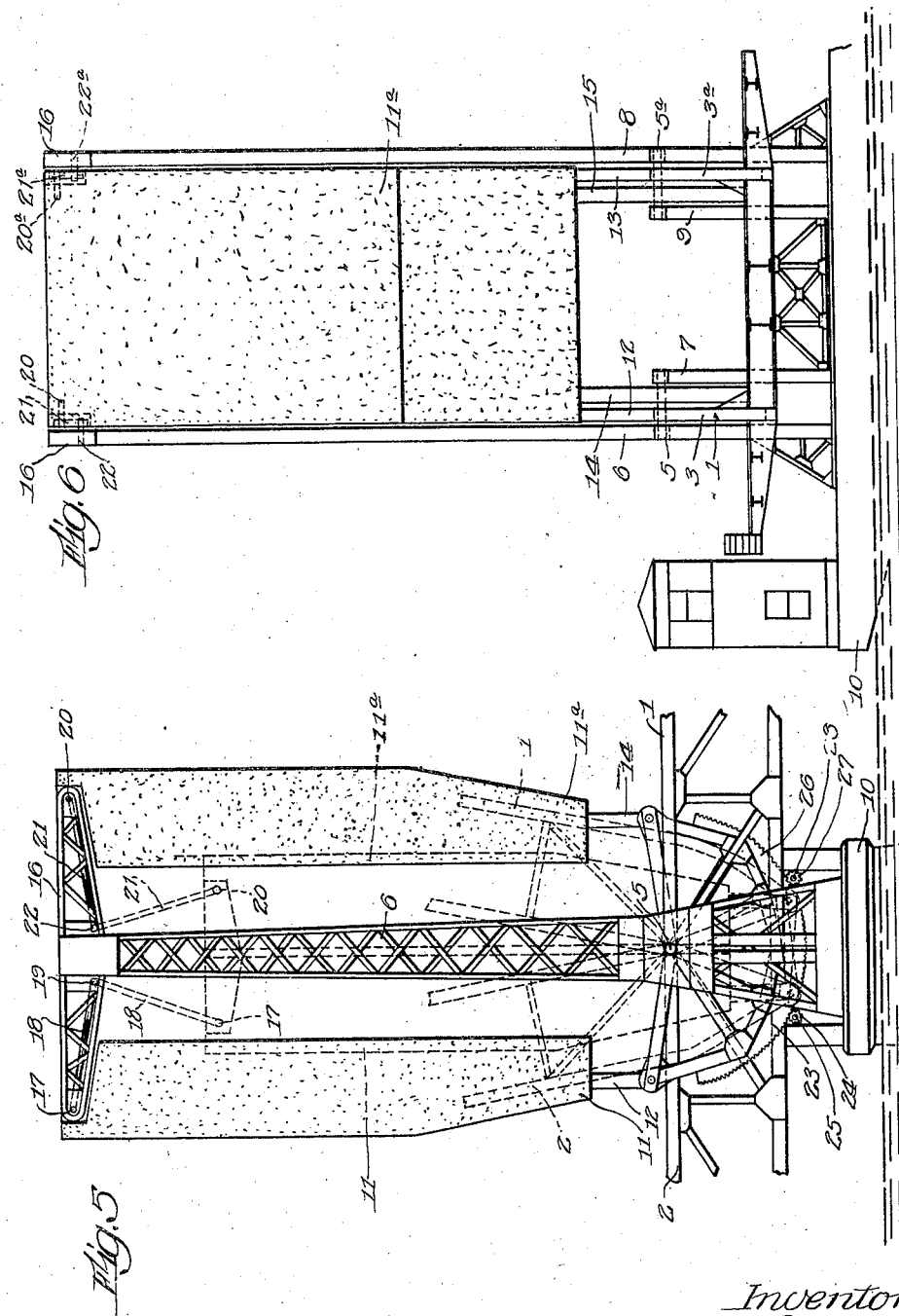

Patented Feb. 1, 1927.

1,615,891

UNITED STATES PATENT OFFICE.

JOSEPH B. STRAUSS, OF CHICAGO, ILLINOIS.

BASCULE BRIDGE.

Application filed February 28, 1925. Serial No. 12,322.

This invention relates to bascule bridges and has for its object to provide a new and improved bridge of this description. The invention has as a further object to provide a bascule bridge having two movable leaves mounted upon the same supports and projecting in opposite directions therefrom.

The invention has as a further object to provide a means for applying counterweights to two bascule leaves mounted upon the same support. The invention has as a further object to provide a bascule bridge having a plurality of moving leaves with overlapping ends.

The invention has further objects which are more particularly pointed out in the accompanying description.

Referring now to the drawings—

Figure 1 is a side elevation showing one form of bridge embodying the invention;

Figure 2 is a sectional view taken on line 2—2 of Figure 1;

Figure 3 is a front elevation of one of the counterweights;

Figure 4 is a plan view of the counterweights;

Figure 5 is an enlarged view showing the counterweights and the adjacent ends of the leaves;

Figure 6 is an enlarged sectional view taken on line 6—6 of Figure 1.

Like numerals refer to like parts throughout the several figures.

Referring now to the drawings, I have shown two movable leaves 1 and 2. The leaf 1 has the main members 3 and 3ª. The leaf 2 has the main members 4 and 4ª. These main members of the leaves 1 and 2 may be trusses or girders. The ends of the leaves overlap, as shown in Figures 1, 2 and 5. A trunnion 5 is connected with the main members 3 and 4 and is mounted upon the outside support 6 and the inside support 7. A similar trunnion 5ª is connected with the main members 3ª and 4ª, and is supported upon the outside support 8 and the inside support 9. These supports are mounted upon the pier 10.

It will be noted, therefore, that the two moving leaves are mounted upon the same supports, the outside supports 6 and 8 extending upwardly to form a tower, and having the upper ends of the counterweights for the moving leaves pivotally connected therewith. The counterweight 11 is pivotally connected by the connecting members 12 and 13 with the main members 3 and 3ª of the moving leaf 1, and the counterweight 11ª is pivotally connected by the connecting members 14 and 15 with the main members 4 and 4ª of the moving leaf 2, these connections being at the rear of the trunnions in each case. The outside supports 6 and 8 are provided with the cross members 16 at the top. Pivoted at 17 and 17ª are the links 18 and 18ª, said links being pivotally connected at 19 and 19ª with the outside supports 6 and 8. Pivotally connected to the counterweight 11ª at 20 and 20ª are the links 21 and 21ª, said links being pivoted at 22 and 22ª with the outside supports 6 and 8. The leaf 1 is provided with the racks 23, which are engaged by pinions 24 on the driving shaft 25, which is operated from any suitable source of power, such as an electric motor. The moving leaf 2 is provided with the rack 26 which is engaged by the pinion 27 on the shaft 28, operated from any suitable source of power, such as an electric motor.

It will be seen that when one of these shafts is operated, one of the moving leaves will be moved, and that when both shafts are operated both moving leaves will be moved. These leaves may be moved independently or together, so as to open or close them. The counterweight for one leaf is provided with slots into which are received the trusses or girders or main members of the other leaf. When the leaf to which said counterweight is attached is lifted and under such conditions the main members of one of the leaves is received in these slots.

It will be noted that when either leaf is raised, the counterweight associated therewith is lowered, and the counterweight connected with the leaf having the main members outside must have these slots to receive the main members of the other leaf. This is clearly illustrated in Figure 3, wherein the counterweight 11 is provided with the slots 30.

It will be noted that each leaf has a separate counterweight and that the counterweight of one leaf is located above the portion of the other leaf.

I claim—

1. A bascule bridge comprising two movable leaves having tail ends which overlap, said leaves extending in opposite directions, trunnions upon which said moving leaves are mounted, separate counterweights for said moving leaves, the counterweight for one leaf located above a portion of the other leaf.

2. A bascule bridge comprising two movable leaves extending in opposite directions and mounted upon a central pier, the tail ends of said moving leaves overlapping, common trunnions for the two leaves, supports for said trunnions which support both leaves, and separate counterweights for said leaves.

3. A bascule bridge comprising two movable leaves projecting in opposite directions, each having separate trusses and having tail ends which overlap, trunnions upon which said leaves are mounted, separate counterweights connected with the tail ends of said movable leaves, a counterweight of one leaf being located above a portion of the other leaf, the counterweight connected with one leaf being provided with slots into which are received the main members of the other leaf when the bridge is opened.

4. A bascule bridge comprising two movable leaves projecting in opposite directions, supports therefor and separate counterweights for the two leaves, the counterweight for one leaf being in the same vertical plane with a portion of the other leaf.

5. A bascule bridge comprising two movable leaves having overlapping portions, trunnions for said movable leaves, the two leaves mounted upon the same trunnions, supports for said trunnions, one of said supports extending upwardly to form a tower, separate counterweights for said movable leaves pivotally connected therewith, said counterweights also pivotally connected with said tower.

Signed at Chicago, county of Cook, and State of Illinois, this 21st day of February, 1925.

JOSEPH B. STRAUSS.